No. 773,035. PATENTED OCT. 25, 1904.
F. A. SMITH.
SURVEYING INSTRUMENT.
APPLICATION FILED FEB. 25, 1904.
NO MODEL. 2 SHEETS—SHEET 1.
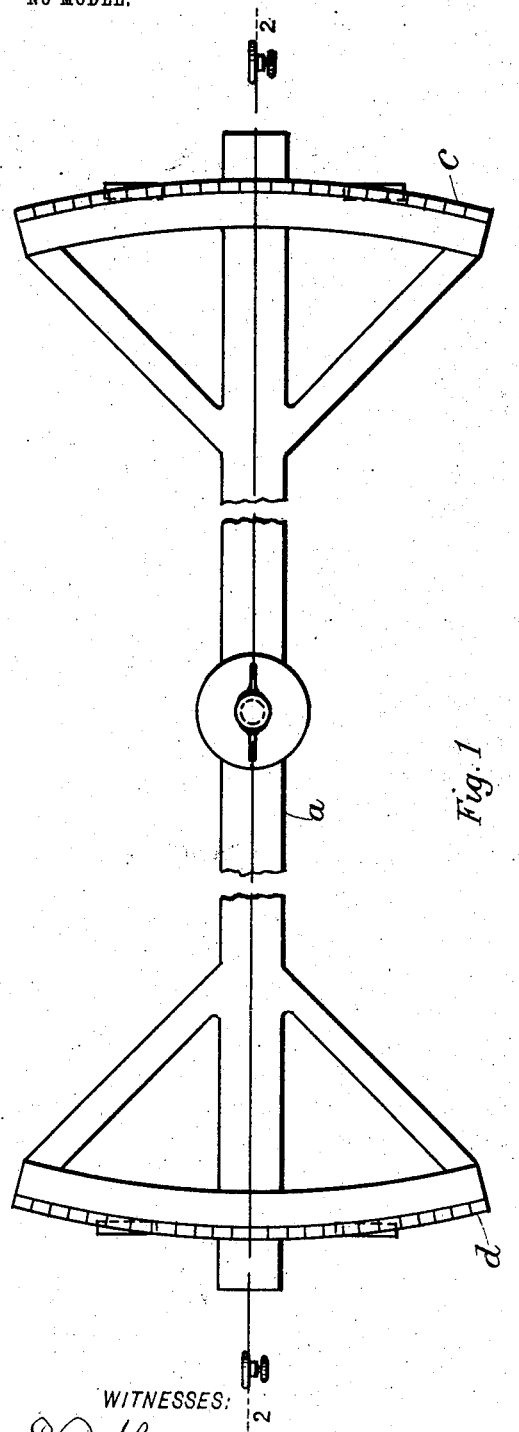
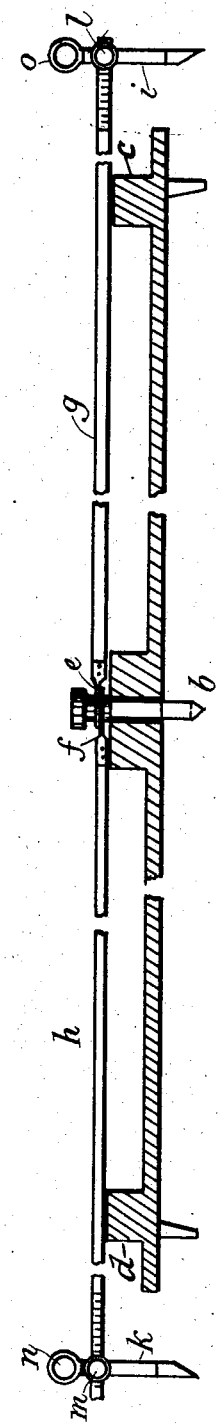
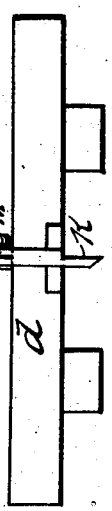
WITNESSES:
E. C. Akers
C. M. Crawford
INVENTOR
F. A. Smith
BY
G. L. Cragg
ATTORNEY No. 773,035. PATENTED OCT. 25, 1904.
F. A. SMITH.
SURVEYING INSTRUMENT.
APPLICATION FILED FEB. 25, 1904.
NO MODEL. 2 SHEETS—SHEET 2.
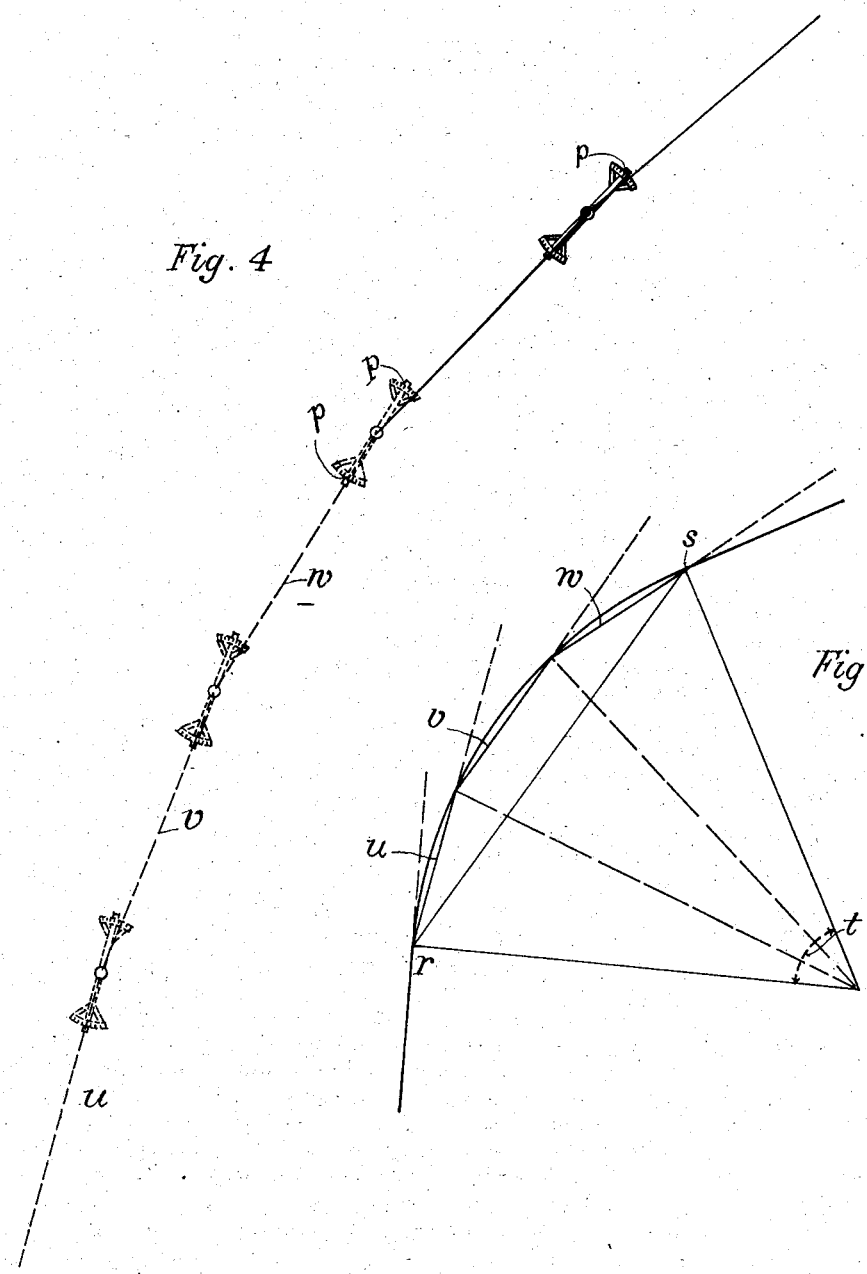

No. 773,035. Patented October 25, 1904.

UNITED STATES PATENT OFFICE.

FREDERICK A. SMITH, OF CHICAGO, ILLINOIS.

SURVEYING INSTRUMENT.

SPECIFICATION forming part of Letters Patent No. 773,035, dated October 25, 1904.

Application filed February 25, 1904. Serial No. 195,217. (No model.)

*To all whom it may concern:*

Be it known that I, FREDERICK A. SMITH, a citizen of the United States, residing at Chicago, in the county of Cook and State of Illinois, have invented a certain new and useful Improvement in Surveying Instruments, of which the following is a full, clear, concise, and exact description, reference being had to the accompanying drawings, forming a part of this specification.

My invention relates to surveying instruments, and has for its object the provision of such instrument that may be used as a portable device in plotting curves in the field and whereby complicated calculations in plotting such curves may be eliminated.

The device of my invention has particular utility in connection with building of railroads, and by its use the curves in tracks may be quickly designed, adjusted, and maintained. To this end I have devised an instrument comprising a bar or frame provided with a scale and a measuring element having swinging connection with the scale element and provided with a marker at its outer end, which end extends a large distance beyond the scale element, whereby the ends of chords corresponding to the angle or degree of curvature selected or desired may be determined.

As is well known, the rolling-mills furnish rails that are suited to standard curvatures in railroad-tracks, and I am enabled, by means of the elongated flexible tape or equivalent measuring element, to define the chords that subtend a given arc of curvature. The measuring-tape that I employ may vary in length from ten to one hundred feet, and each tape is desirably provided at its free or outer end with scale-marks thereupon and placed in association with a sliding rider, whereby a given tape may be suited to a variety of curvatures. The frame bearing the scale is preferably provided with a marker or pointer located coaxially with the axis of rotation of the anchored end of the measuring-tape. This marker or pointer may, if desired, and preferably in some constructions of the instrument is made separable from the frame and may then be in the form of a pin passing through an opening in the frame that defines the location of the marked point with respect to the axis of rotation of the measuring-tape. By extending the measuring element beyond the scale upon the said frame and by making at least that portion of the measuring element that thus extends beyond the frame flexible the instrument is especially well adapted to the purpose designated. It will be apparent to those skilled in surveying and trackwork that the measuring element by being properly alined with a selected mark upon the scale-protractor may be made accurately to define the limits of the chords, for by placing the markers of the measuring element in the same straight line with the selected mark upon the scale it is obvious that the free or outer marker of the measuring element must find its location at the proper chord-terminal. After one chord has thus been located the frame, together with the anchored end of the tape, may be carried by one man forward to the point previously defined by the free tape-marker, the man who carries the free tape-marker then moving forward another chord length, whereupon the second chord may be mapped out similar to the first, and so on until the proper arc or curve has been established in tangential relation with the straight portions of the track.

In order to render the instrument very precise and to enable the measurements to be checked in the process of mapping out the curves, I preferably provide each frame with two scales or protractors, one at each end of the frame, with the frame-marker disposed exactly midway between said protractors. Such an instrument includes two measuring elements or tapes, that are substantially alike and which desirably have the same anchorage upon the measuring-frame, whereby the anchored ends of the tapes have a common axis of rotation. One of these tapes is extended forwardly of the frame and the other to the rear of the frame. An instrument of this complete form is to be handled by three men, one man carrying the measuring-frame, another man the free end of the forward tape, and the third man the free end of the rearwardly-extending tape, so that the intermediate man may with the aid of the rear man check the chords defined by the intermediate man, and the one carrying the forward tape for alinement is also effected with the frame-marker, the free end of the rear tape, and the mark upon the rear end of the frame in the checking process. The three men thus travel along the chords of the desired curve, the frame-marker being registered with the mark made by the marker upon the free end of the forward tape, while the marker upon the free end of the rearwardly-extending tape is caused to register with the mark just previously made by the frame-marker. The work of plotting a curve may thus be very quickly, accurately, and certainly accomplished, and as the rolling-mills turn out rails suited to standard curvatures such rails may readily be laid to conform to the curves defined by the chords thus plotted upon the ground, stakes being driven at the points defined by the marks made by the markers of the surveying instrument.

I do not wish in all embodiments of my invention to be limited to a rearwardly-extending tape or measuring device coextensive with the length of the forward tape, as other means may be devised for checking the plotted chords.

I will explain my invention more fully by reference to the accompanying drawings, in which—

Figure 1 is a plan view of the device of my invention, the measuring elements or tapes obviously being illustrated as being broken owing to their great length. Fig. 2 is a sectional view on line 2 2 of Fig. 1. Fig. 3 is an end view of the structure indicated in Figs. 1 and 2. Fig. 4 is a clear diagrammatic illustration of one use of the device of the invention. Fig. 5 illustrates geometrically and more fully the use illustrated in Fig. 4.

Like parts are indicated by similar characters of reference throughout the drawings.

Any suitable construction may be employed for the scale-bearing element of the instrument, which I term the "frame" of the instrument, (indicated at $a$.) This scale or protractor bearing element of the instrument is in practice preferably of such lengths as to afford a space between the center axis defined by the marker or pointer $b$ and the outer peripheral edge of the protractor or scale $c$ of 28.65 inches, and where another scale, $d$, is added the length is extended sufficiently to permit the same distance of 28.65 inches to exist between the marker of the frame and the edge of the added scale. Where there are two protractors to each measuring-frame, the marker $b$ is desirably made removable, and in addition to serving its function as marker it may also act as a journal to be inclosed by the ring ends $e\,f$ of the measuring tapes or elements $g\,h$, though I do not wish to be limited to such a separable relation of the measuring-frame and its marker, nor do I wish to be limited to the use of the pin as a journal for the inner ends of the tapes, as other construction may be devised without departing from the spirit of my invention. The measuring elements $g\,h$ may be of any suitable lengths of, say, from ten to one hundred feet, and each is most desirably provided with scale-marks upon its outer or free end, where there is located a riding marker or pointer $i$ for the tape $g$ and $k$ for the tape $h$, whereby tapes of given lengths may be adapted to the plotting of curves of different degrees. Such connection of the adjustable markers $i$ and $k$ with the tapes $g$ and $h$ may be had by means of set-screws $l$ and $m$. Such markers in addition to terminating in sharp points at their lower ends are also provided with finger-rings $n$ and $o$ at their upper ends for convenience in carrying the tapes and manipulating the markers. The protractors $c$ and $d$ are graduated or marked to suit the particular service or services for which the instrument may be used.

I have illustrated one particular use of the instrument, though it is obvious that other uses may be devised, and I do not, therefore, wish to be limited to the specific use set forth. The instrument is shown as being serviceable in plotting chords of curves in railroad-tracks, to which end the protractors $c$ and $d$ are provided with scale marks or divisions which define the chords that the measuring-tapes may determine, the different scale-marks defining different chord lengths, and in that way the different degrees of curvature. Having only illustrated this single adaptation of the instrument, I have only indicated one set of scale-marks upon each protractor. The protractors have each a central scale-mark $p$, (visible only in Fig. 4,) which may be termed the "zero-mark", which marks are in the same straight line with the axis and point of the marker $b$. Obviously when the tapes register with said axis and said zero-marks they must together define a straight line. When such a straight line is to be departed from, as in joining a straight stretch of track with a curved track portion, the advanced tape $g$ (indicated most clearly in Fig. 4) is deflected from such straight line to one side or the other of said zero-point to register with another scale-mark that in the manufacture of the instrument is known to determine the extent of deflection from the straight line, and thereby the degree of the curve that is to be plotted, which operation will be fully understood by reference to Figs. 4 and 5. As is well known in practice of this sort, the standard degree of curvature is one degree, by which is meant that when a chord of one hundred feet in length subtends an angle of one degree a track curvature of one degree is defined. Fig. 5 may, for example, be understood to indicate between the points $r$ and $s$ a chord of one hundred feet in length subtending an angle $t$ of one degree, (this angle obviously being exaggerated in the drawings for purpose of illustration.) A chord of such a length or of other lengths greater and less are not desirably plotted in a single operation by the device of my invention, for which purpose a plurality of chords is plotted in place of a single very long chord, there being three such chords *u v w* in place of the single chord *r s*, as indicated in Fig. 5. These chords *u v w* are also indicated in Fig. 4. A plurality of these minor or supplemental chords is laid out, as previously described and most clearly indicated in Figs. 4 and 5. The connected chords plotted as described and indicated are desirably located midway between the lines to be occupied by the rails, any suitable form of track-gage being employed to determine the position of the rails with respect to the chords. In the plotting indicated in Fig. 4 the rear tape *h* should always be in line with the zero-mark upon the rear scale, and for this particular service an extended rear scale is not required. I prefer, however, to provide duplicate scales *c* and *d*, so that the instrument may be flexible in its character and may be of particular service in laying off into sections, which use will be readily understood by those skilled in the art, the operation being then reversed, the front and rear tape men changing places. That portion of the tapes between the axial pin *b* and the scales *c* and *d* should define a perfectly straight edge, and for this purpose these portions of the tapes are preferably unjointed, being made from single strips or ribbons of steel. The balance of the tapes are desirably made of the same material and are preferably without joints, though any construction where the tapes are flexible, so as to permit them to be rolled for transport and wherein the marker of each tape is adapted to make a mark upon the ground that is in the same straight line with the mark made by the marker *b* and the selected scale-mark, will answer the purpose satisfactorily.

It is obvious that changes may readily be made from the form of my invention herein shown and particularly described, and I do not, therefore, wish to be limited to the precise construction illustrated; but,

Having thus described my invention, I claim as new, and desire to secure by Letters Patent, the following:

1. In a surveying instrument, the combination with the protractor-bearing element thereof provided with a pointer for marking the ground, of measuring-tapes mounted to swing upon said protractor element and extending beyond the said element whereby the angular directions of the measuring-tapes may readily be determined, pointers at the free ends of the measuring-tapes for marking, said protractor-bearing element having two protractors between which said measuring-tapes are anchored, the said tapes being mounted to swing about a common axis, substantially as described.

2. In a surveying instrument, the combination with the protractor-bearing element thereof, of measuring-tapes mounted to swing upon said protractor-bearing element and extending beyond the said element whereby the angular direction of the measuring-tapes may readily be determined, and pointers at the free ends of the measuring-tapes for marking, said protractor-bearing element having two protractors between which said measuring-tapes are anchored, the said tapes being mounted to swing about a common axis, substantially as described.

3. In a surveying instrument, the combination with the protractor-bearing element thereof provided with a pointer for marking the ground, of measuring-tapes mounted to swing upon said protractor element and extending beyond the said element whereby the angular direction of the measuring-tapes may readily be determined, and pointers at the free ends of the measuring-tapes for marking, substantially as described.

4. In a surveying instrument, the combination with the protractor-bearing element thereof, of measuring-tapes mounted to swing upon said protractor-bearing element and extending beyond the said element whereby the angular direction of the measuring-tapes may readily be determined, and pointers at the free ends of the measuring-tapes for marking, substantially as described.

5. In a surveying instrument, the combination with the protractor-bearing element thereof provided with a pointer for marking the ground, of measuring-tapes mounted to swing upon said protractor-bearing element and extending beyond the said element whereby the protractor portion of the element is located between the ends of said measuring-tapes and whereby the angular direction of the measuring-tapes may readily be determined, and a pointer at the free ends of the measuring-tapes for marking, said protractor-bearing element having two protractors between which said measuring elements are anchored, substantially as described.

6. In a surveying instrument, the combination with the protractor-bearing element thereof, of measuring-tapes mounted to swing upon said element and extending beyond the said element whereby the angular direction of the measuring-tape may readily be determined, and pointers at the free ends of the measuring-tapes for marking, said protractor-bearing element having two protractors between which said measuring-tapes are anchored, substantially as described.

7. In a surveying instrument, the combination with the protractor-bearing element thereof provided with a pointer for marking the ground, of a measuring element mounted to swing upon said protractor element and extending beyond the said element whereby the protractor portion of the element is located between the ends of said measuring element and whereby the angular direction of the measuring element may readily be determined, and a pointer at the free end of the measuring element for marking, said pointer being adjustable upon the measuring element while said measuring element is provided with scale-marks to determine the effective length thereof and to which the pointer may be adjusted, substantially as described.

8. In a surveying instrument, the combination with the protractor-bearing element thereof, of a measuring element mounted to swing upon said protractor-bearing element and extending beyond the said element whereby the protractor portion of the element is located between the ends of said measuring element and whereby the angular direction of the measuring element may readily be determined, and a pointer at the free end of the measuring element for marking, said pointer being adjustable upon the measuring element while said measuring element is provided with scale-marks to determine the effective length thereof and to which the pointer may be adjusted, substantially as described.

In witness whereof I hereunto subscribe my name this 23d day of February, A. D. 1904.

FREDERICK A. SMITH.

Witnesses:
G. L. CRAGG,
C. H. CRAWFORD.